H. F. POPE.
RADIAL DRAFT GEAR.
APPLICATION FILED AUG. 21, 1908.

947,258.

Patented Jan. 25, 1910.
6 SHEETS—SHEET 1.

WITNESSES
R A Baldwin
W. W. Swartz

INVENTOR
Henry F. Pope

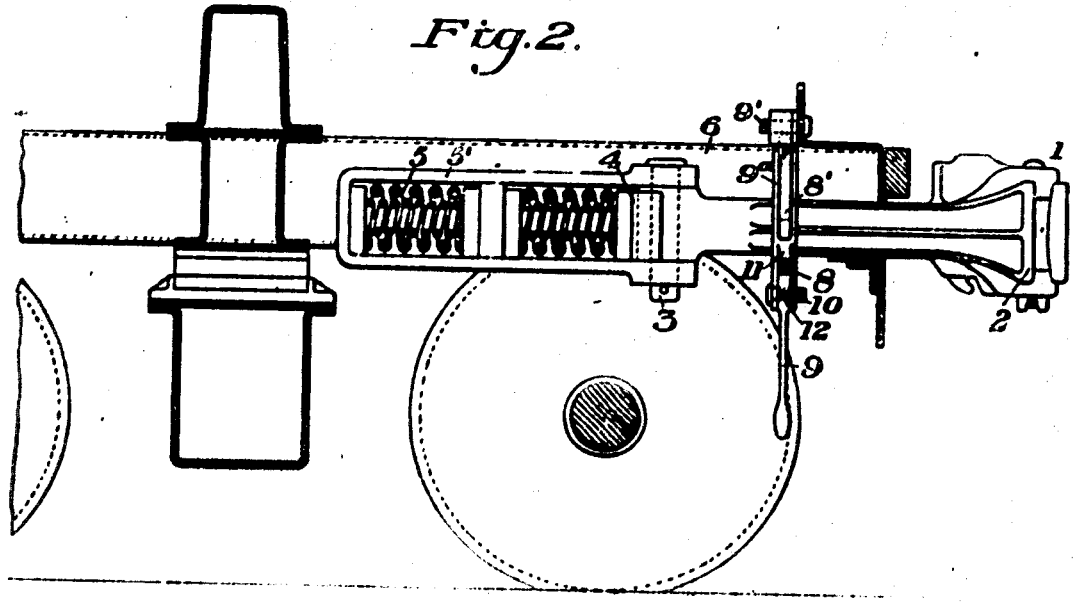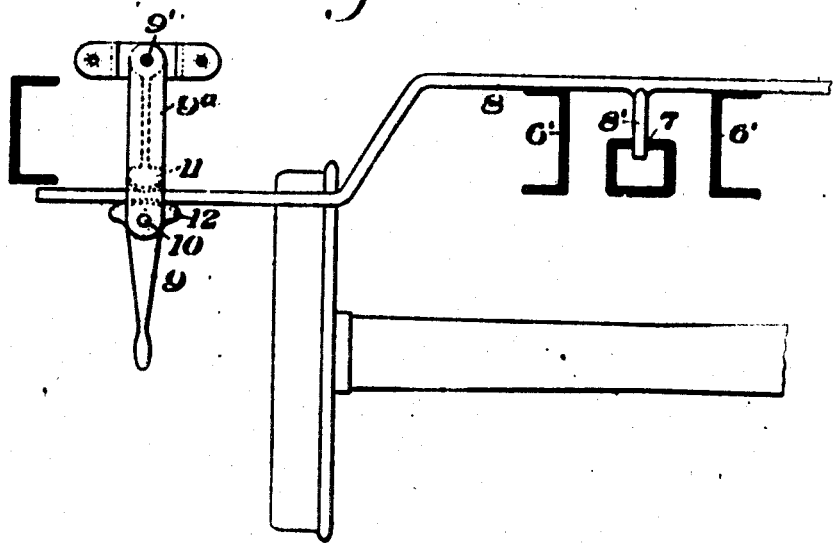

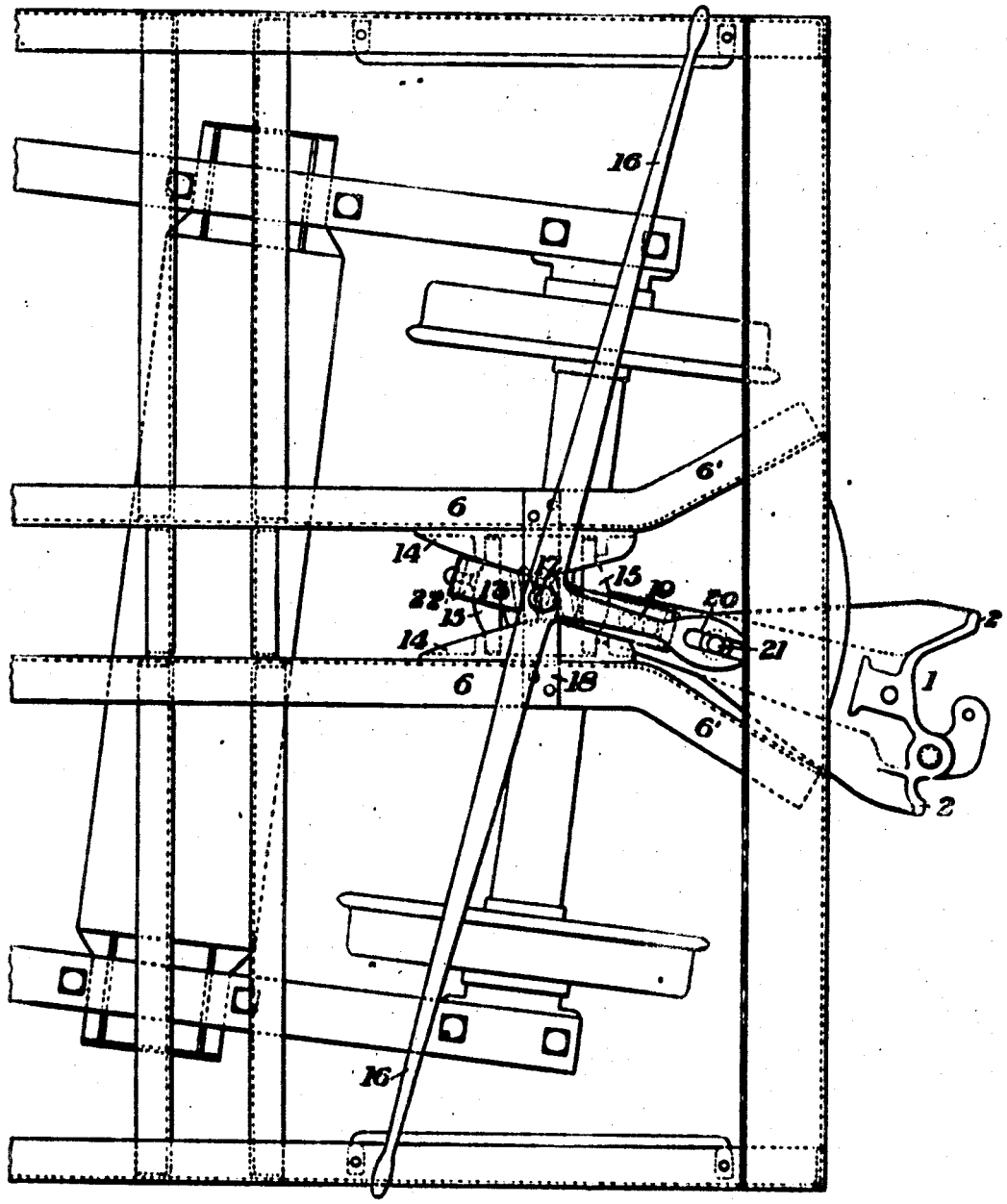

H. F. POPE.
RADIAL DRAFT GEAR.
APPLICATION FILED AUG. 21, 1908.

947,258.

Patented Jan. 25, 1910
5 SHEETS—SHEET 4.

WITNESSES
R A Balderson
W W Swartz

INVENTOR
Henry F. Pope
by Bakewell, Byrnes, Parmelee
his Attys

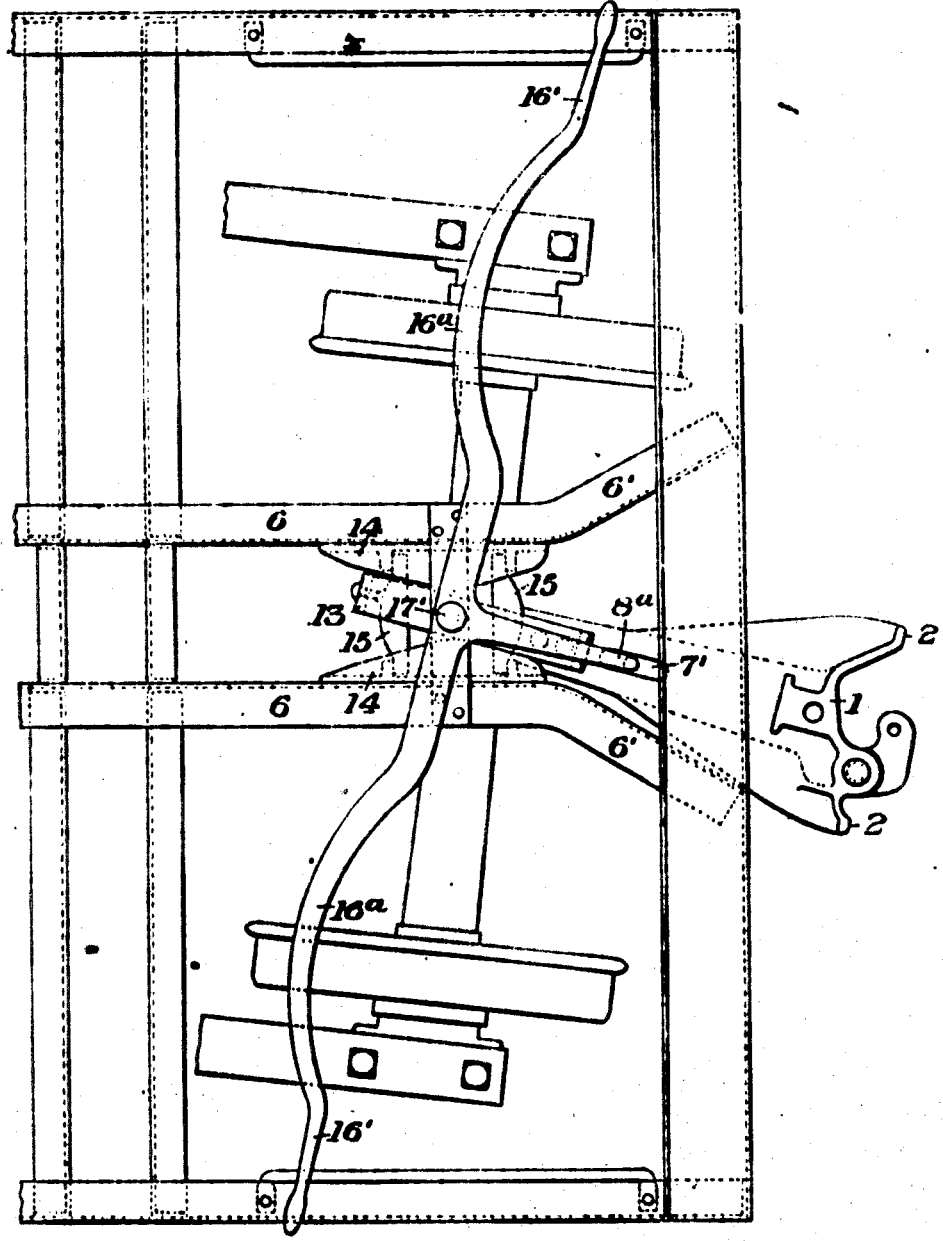

UNITED STATES PATENT OFFICE.

HENRY F. POPE, OF CLEVELAND, OHIO, ASSIGNOR TO THE NATIONAL MALLEABLE CASTINGS COMPANY, OF CLEVELAND, OHIO, A CORPORATION OF OHIO.

RADIAL DRAFT-GEAR.

947,258.

Specification of Letters Patent.   Patented Jan. 25, 1910.

Application filed August 21, 1908.   Serial No. 449,595.

*To all whom it may concern:*

Be it known that I, HENRY F. POPE, of Cleveland, in the county of Cuyahoga and State of Ohio, have invented a new and useful Radial Draft-Gear, of which the following is a specification, reference being had to the accompanying drawing, forming part of this specification, in which—

Figure 1:
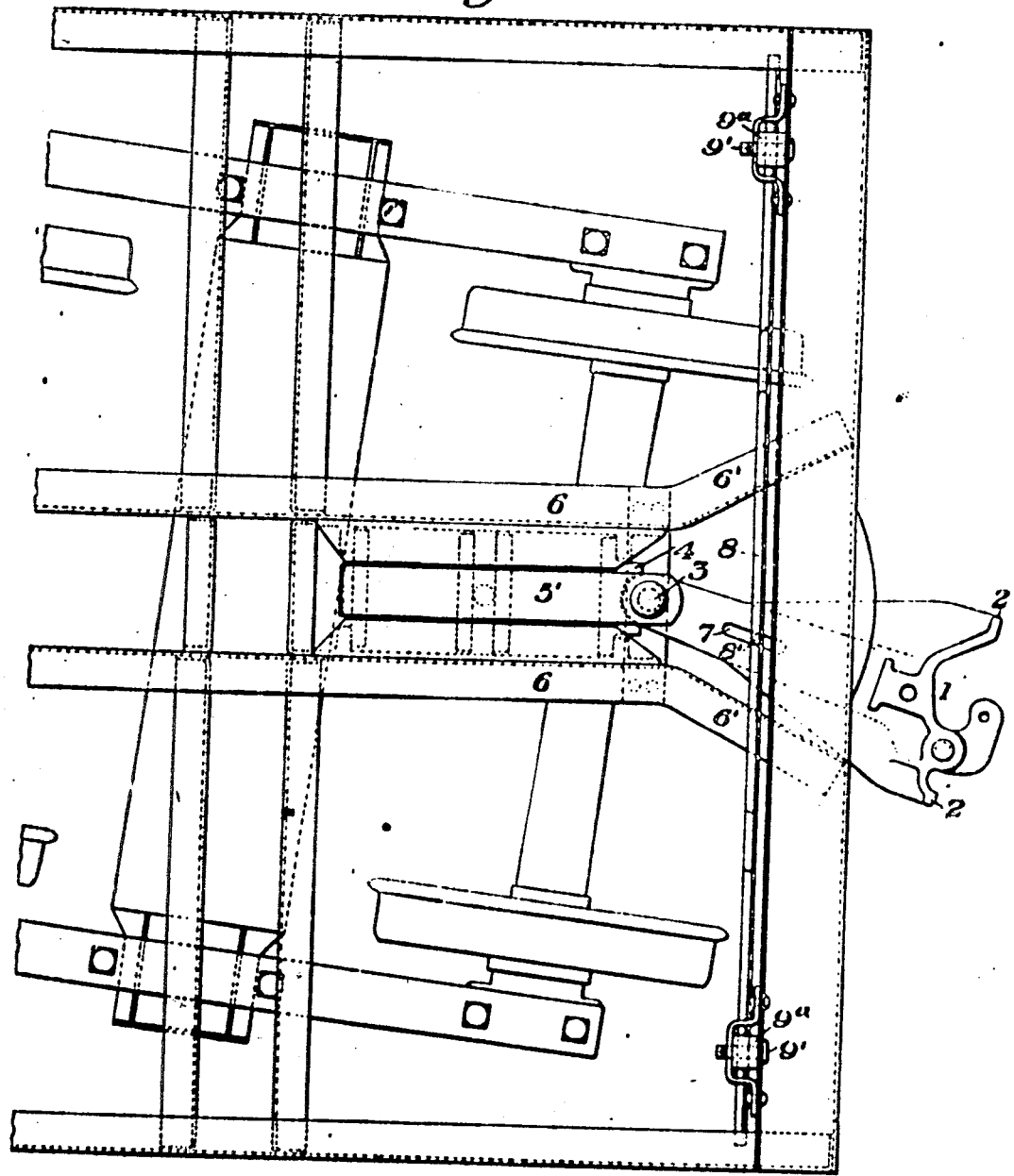
Figure 5:
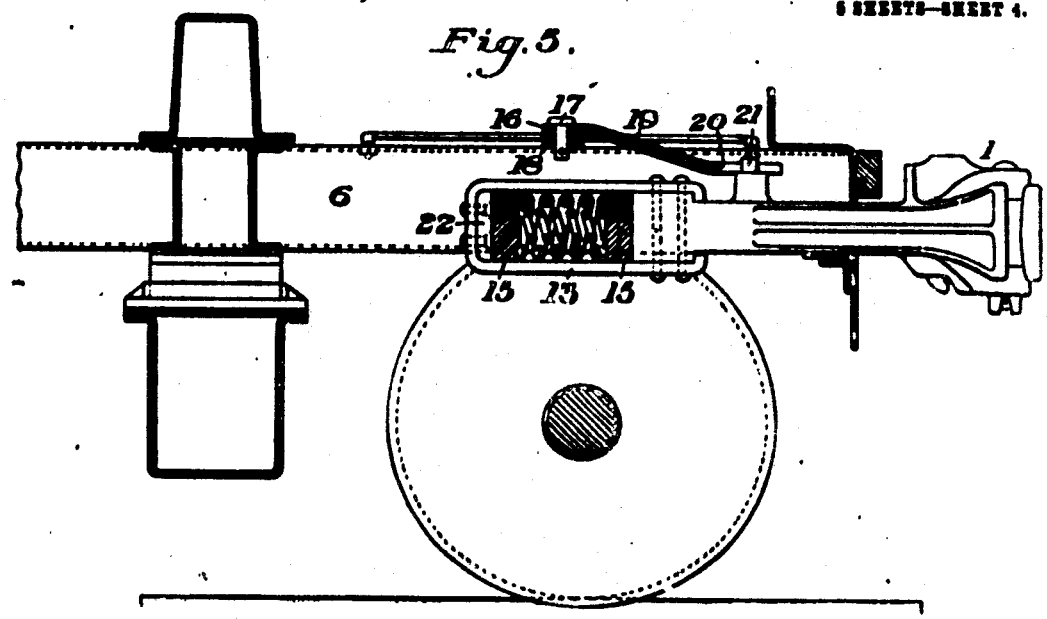
Figure 6:
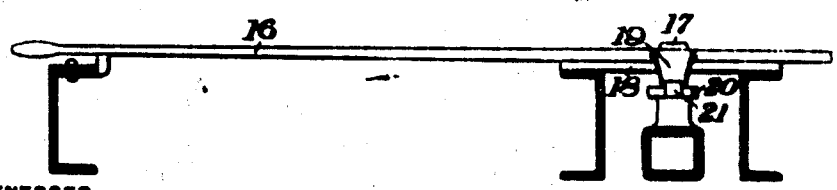

Figure 1 is a plan view of my improved device showing its application to the frame of a car; Fig. 2 is a side elevation partly in vertical longitudinal section; Fig. 3 is a cross-sectional view illustrating part of the device; Figs. 4, 5 and 6 are views similar to Figs. 1, 2 and 3, showing a modified construction; Fig. 7 is a plan view; and Fig. 8 a sectional detail view, showing means for automatically disengaging the shifting device from the coupler.

In the drawings (Figs. 1, 2 and 3), 1 represents the coupler which is of the Master Car Builders' type, but is provided at the sides of its head with stops 2, 2, which are adapted to match and to engage with corresponding stops on the coupler of the adjoining car, so that when the cars are coupled together, these stops will hold the couplers in alinement with one another and will prevent the tendency of the couplers to buckle when subjected to buffing stresses. The shank of the coupler is pivoted by means of a pin 3 to the yoke 5′ of the draft rigging, and the rear end of the coupler shank and the face of the forward follower 4 are rounded so as to fit one another, the arc on which they are formed having its center preferably the center of the pivot pin 3, so that the strains of buffing are transmitted to the front follower by a broad bearing surface in all the positions to which the coupler may be deflected laterally. The draft rigging 5, of which the front follower 4 forms a part, is set between the center sills 6, 6 of the car, so as to be capable of the ordinary longitudinal motion in buffing and draft, but to be held by the sills from lateral motion. At the end of the draft rigging these sills diverge, as at 6′, to afford space for the lateral swinging of the car coupler.

For the purpose of adjusting the coupler laterally in the proper position for coupling with the coupler of another car, I employ a manually operated mechanism for shifting it on its axis 3, and this mechanism may be constructed as follows:—The shank of the coupler is provided, in its upper wall, with a longitudinal slot 7 into which is inserted the depending arm 8′ of a rod 8, which extends over the center sills 6′ nearly to the sides of the car. It is operated by means of a lever 9 which is pivoted at its upper end, at 9′, to the end sill of the car, and is composed of two parts, the lower part 9 being pivoted at 10 to the upper part 9ª, which latter part is slotted to receive the part 9 and has between the slotted or forked portion a lug 11, which is opposed by a curved or cam-shaped end 12 at the end of the lower portion 9. The rod 8 extends through the slot between the parts 11 and 12 and when the operator grasps the part 9 of the lever and turns it, it will cause the cam 12 to grip the rod 8 between it and the lug 11 so that by swinging the lever on the pivot 9′, the coupler shank may be shifted radially on the axis 3, so as to bring it into position required for coupling with the coupler of an on-coming car. When the coupling is effected, the lever 9, 9ª being released, will permit the rod 8 to slide freely back and forth and the couplers will be held in alinement by the engagement of their stops 2, 2.

Instead of the lever 9, 9ª, constructed as shown in Figs. 1, 2 and 3, the mechanism by which the coupler is shifted back and forth into uncoupling position may be varied in many ways. As an example of this, I show a modification in Figs. 4, 5 and 6, wherein I show not only a modification of the means for shifting the coupler laterally, but also show a modified construction of the draft gear to which the coupler is applied. Here the coupler 1 is affixed rigidly to a yoke 13, the forked arms of which pass above and below the draft rigging and are confined laterally between two cheek pieces 14 at the sides of the draft rigging, these cheek pieces being made angular in form so as to present a central fulcrum on which the yoke can rock. The end followers 15 of the draft rigging are curved, the radius being about one-half of the length of the draft rigging, and the bearing surfaces at the ends of the slotted or forked portion of the yoke are similarly curved so that as the yoke is rocked between the side plates 14, it will preserve an end bearing against the curved surfaces of the end followers of the draft rigging. When thus constructed, the coupler can be swung back and forth on the fulcrum above mentioned and will buff or pull against the curved followers in any position to which it may be moved.

For the purpose of shifting the coupler laterally into position for coupling with another car, I may employ with the device shown in Figs. 4 and 5 either the same mechanism which is illustrated in Figs. 1, 2 and 3, or I may employ a lever 16, which is pivoted at 17 to a bracket or cross piece 18 on the center sills, and this lever has, at its middle, a forwardly projecting arm 19, which is connected by a forked or slotted connection 20, so as to engage slidingly with a pin 21 on the top of the shank of the coupler. This lever arm 16 projects in both directions to the sides of the car and when it is grasped at either end and swung it will correspondingly swing the coupler on the pivotal center of the draft rigging so as to bring it into the desired position for coupling. The rear end of the coupler shank is curved to match the end follower, and at the rear end of the yoke there is a filler block 22, whose surface matches the rear follower. A filler block may be attached to the end of the coupler also by the same rivets which attach the yoke to the coupler.

Figure 8:
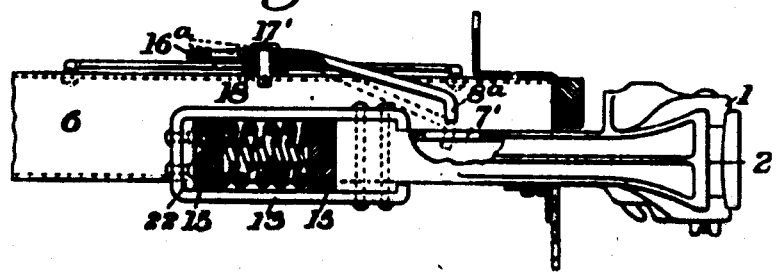

In Figs. 7 and 8, I show a construction of the device in which the shifting mechanism is engaged detachably with the coupler, so that when the coupler is not being shifted, it may be free from the shifting rod and will not move the latter. Here the operating lever 16' is pivoted loosely at 17' and is bowed at 16ª or otherwise counterweighted so that it will tend to tilt on the pivot and to lift its lip 8ª out of engagement with the slot 7' of the coupler shank. When the operator desires to shift the coupler he turns the lever 16' horizontally on the pivot until the lip 8ª comes over the slot 7', then tilts the lever so as to bring the lip and slot into engagement, whereupon further turning of the lever will shift the coupler. When the lever is released, it will tilt back and thus free the lip automatically from engagement with the coupler, leaving the coupler free to move independently of the lever. This part of my invention may be applied to any of the constructions shown in the drawings and in variously modified forms.

Other modifications of the invention will suggest themselves to those skilled in the art, since

What I claim is:

1. A radially movable draft member having a manually-actuated shifting device extending to the side of the car and comprising a lever having a sliding bearing with the coupler.

2. A radially movable draft member having a manually actuated shifting device extending to the side of the car and comprising a lever with a projection thereon having a sliding bearing with the coupler.

In testimony whereof, I have hereunto set my hand.

HENRY F. POPE

Witnesses:
HARRY E. ORR.
CHAS. E. POPE.